(12) United States Patent
Ogasahara

(10) Patent No.: US 8,705,987 B2
(45) Date of Patent: Apr. 22, 2014

(54) SIGNAL PROCESSING CIRCUIT, SIGNAL PROCESSING METHOD, OPTICAL RECEIVER AND OPTICAL COMMUNICATION SYSTEM

(75) Inventor: Daisaku Ogasahara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/990,603

(22) PCT Filed: Feb. 16, 2012

(86) PCT No.: PCT/JP2012/054335
§ 371 (c)(1),
(2), (4) Date: May 30, 2013

(87) PCT Pub. No.: WO2012/111847
PCT Pub. Date: Aug. 23, 2012

(65) Prior Publication Data
US 2013/0251369 A1    Sep. 26, 2013

(30) Foreign Application Priority Data

Feb. 17, 2011    (JP) ................................. 2011-031647

(51) Int. Cl.
*H04B 10/00* (2013.01)
(52) U.S. Cl.
USPC .......................................... 398/208; 398/205
(58) Field of Classification Search
CPC ..... H04J 14/06; H04B 10/614; H04B 10/615; H04B 10/6164; H04B 10/6165
USPC ............................. 398/65, 205–206, 208–211
See application file for complete search history.

(56) References Cited

U.S. PATENT DOCUMENTS

2010/0329697 A1    12/2010  Koizumi et al.

FOREIGN PATENT DOCUMENTS

| CN | 101931469 A | 12/2010 |
|---|---|---|
| EP | 2273703 A1 | 1/2011 |
| JP | 2009-194784 A | 8/2009 |
| JP | 2010-28470 A | 2/2010 |
| JP | 2010-193204 A | 9/2010 |
| JP | 2011-9956 A | 1/2011 |
| KP | 10-20100138772 A | 12/2010 |

OTHER PUBLICATIONS

Written Opinion of the International Searching Authority issued Oct. 4, 2012 in corresponding PCT Application No. PCT/JP2012/054335.

*Primary Examiner* — Leslie Pascal
(74) *Attorney, Agent, or Firm* — Sughrue Mion, PLLC

(57) ABSTRACT

In order to reduce influence of noise due to a phase deviation, and to estimate an amount of phase compensation with superior accuracy in a polarization multiplexing/demultiplexing optical communication system, a signal processing circuit includes: optical frequency deviation estimating unit for estimating a frequency deviation which is a difference between a frequency of local light and a frequency of the optical carrier wave which is included in a signal data which corresponds to the polarizations and are generated by mixing a plurality of the optical carrier waves with the local light, which optical carrier wave is phase-modulated and have polarizations able to be demultiplexed and for outputting the estimated frequency deviation as an estimated value; for outputting the estimated frequency deviation as an estimated value; optical frequency deviation compensation amount analyzing unit for calculating an amount of frequency compensation which is an amount of compensation to make a phase of the signal data rotated so as to reduce the frequency deviation, on the basis of a plurality of the estimated values estimated per the signal data; optical frequency deviation compensating unit for making the phase of the signal data rotated correspondingly to the amount of the frequency compensation; optical phase deviation estimating unit for estimating a phase deviation included in each of input signal data and is a difference between a phase of the optical carrier wave and a phase of the local light; and optical phase deviation compensating unit for making the phase of the signal data rotated correspondingly to the phase deviation.

12 Claims, 12 Drawing Sheets

SIGNAL PROCESSING CIRCUIT, SIGNAL PROCESSING METHOD, OPTICAL RECEIVER AND OPTICAL COMMUNICATION SYSTEM

CROSS REFERENCE TO RELATED APPLICATIONS

This application is a National Stage of International Application No. PCT/JP2012/054335, filed on Feb. 16, 2012, which claims priority from Japanese Patent Application No. 2011-031647, filed on Feb. 17, 2011, the contents of all of which are incorporated herein by reference in their entirety.

TECHNICAL FIELD

The present invention relates to a signal processing circuit, a signal processing method, an optical receiver and an optical communication system and in particular, relates to an art for compensating an optical phase deviation and an optical frequency deviation of an optical carrier wave in a polarization multiplexing/demultiplexing optical communication system.

BACKGROUND ART

As a result of a rapid increase in an amount of traffic of a backbone communication system due to the prevailing Internet, it is desired to develop a practical ultra high speed optical communication system beyond 40 Gbps. As an art which realizes such an ultra high speed optical communication system, the optical phase modulation method and the optical polarization multiplexing/demultiplexing art are noted.

The optical phase modulation method different from the optical intensity modulation method carrying out data modulation of an optical intensity of a laser beam, carries out data modulation of a phase of the laser beam. As the optical phase modulation method, a method of QPSK (Quadruple Phase Shift Keying) or 8 PSK is well known. According to the optical phase modulation method, it is possible to lower a symbol rate (baud rate) by assigning a plurality of bits to one symbol. For this reason, since it is possible to lower a working speed of an electric device by use of the optical phase modulation method, it is expected to reduce a manufacturing cost of an apparatus.

For example, in the case of the QPSK method, 2 bits (for example, 00, 01, 11 and 10) are assigned to four optical phases (for example, 45 degrees, 135 degrees, 225 degrees and 315 degrees) respectively. As a result, a symbol rate of QPSK is reduced to a half of a symbol rate (that is, bit rate) of the light intensity modulation method.

FIG. 5 exemplifies a constellation and a symbol mapping of QPSK. The constellation is a figure showing a symbol and a bit stream assigned to the symbol, on a phase plane. Four symbols of QPSK are shown in FIG. 5. Moreover, FIG. 5 shows also the bit stream (00, 01, 11 and 10) associated with each the symbol in the optical phase modulation method. It is called the symbol mapping to associate the bit stream with each the symbol as mentioned above. Here, in FIGS. 5 to 7, a horizontal axis and a vertical axis are an I (inphase) axis and a Q (quadrature) axis respectively.

Hereinafter, an optical communication method which uses QPSK as the optical phase modulation method will be exemplified. However, even if another optical phase modulation method is used, the following description is applicable to the optical phase modulation method.

In order to receive an optical signal based on the optical phase modulation method, the optical coherent reception method is used. In the optical coherent reception method, a signal light and a laser beam which has almost the same optical frequency as the signal light has (called as a local oscillation light or a local light) are combined by an optical element called a 90 degrees hybrid. Then, a light receiving element which receives an output of the 90 degrees hybrid outputs a beat signal between the signal light and the local light. Since the basic art of the optical coherent reception method is well known, only an outline will be described below.

To make description simple, it is supposed that polarizations of the signal light and the local light are the same linear polarization type. In the case that the optical coherent reception method is used, an alternating current component of an electric signal, output by the light receiving element, is the beat signal between the optical signal and the local light. The amplitude of the beat signal is proportional to strength of the signal light and strength of the local light. If a frequency of an optical carrier wave of the optical signal and a frequency of the local light are identical with each other, a phase of the beat signal is a phase difference between a phase of the signal light and a phase of the local light. Meanwhile, if the phase of the local light is identical with an optical phase of an optical carrier wave (laser beam) input to an optical modulator of an optical transmitter, the phase of the beat signal is identical with the phase of the laser beam in the optical transmitter. For this reason, by carrying out the symbol mapping to the phase of the beat signal, and converting the phase of the beat signal into a bit stream, it is possible to regenerate transmission data with which the optical carrier wave is phase-modulated in the optical transmitter. That is, if the optical transmitter transmits an optical signal which has the constellation shown in FIG. 5, it is possible that the optical receiver regenerates signals which have the similar constellation.

However, in general, the frequency of the optical carrier wave of the signal light and the frequency of the local light are not identical perfectly. Furthermore, the phase of the local light in the optical receiver is not identical usually with the phase of the laser beam input to the optical modulator in the optical transmitter. An optical phase difference between the optical carrier wave input to the optical modulator in the optical transmitter and the local light in the optical receiver is called an optical phase deviation. Moreover, a difference between the frequency of the optical carrier wave of the optical signal and the frequency of the local light is called an optical carrier wave frequency deviation (hereinafter, referred to as "optical frequency deviation").

FIG. 6 shows a constellation of a QPSK signal in the case that the optical phase deviation exists. In the case that the optical phase deviation exists, signals whose constellation is rotated by an angle corresponding to the optical phase deviation in comparison with the constellation shown in FIG. 5, are received. It is impossible to know a value of the optical phase deviation in advance. For this reason, when carrying out the symbol mapping shown in FIG. 5 just as it is to the data shown in FIG. 6, and converting into the bit stream, false data may be regenerated.

Furthermore, in the case that the optical frequency deviation exists, the phase of the above-mentioned beat signal has a value obtained through adding the optical phase deviation to a product of the optical frequency deviation and a reception elapse time. For this reason, in the case that the optical frequency deviation exists, as shown in FIG. 7, signals whose constellation shown in FIG. 5 is rotated temporally are received. Since the phase of the beat signal continues to change temporally in this case, it is impossible to regenerate data on the basis of the phase of the beat signal by use of the symbol mapping shown in FIG. 5.

Accordingly, in the case of the optical phase modulation method, a function to compensate the optical phase deviation and the optical frequency deviation is mandatory in order to reduce influence caused by rotation of the constellation due to the optical phase deviation and the optical frequency deviation. Hereinafter, a process of compensating the optical phase deviation and the optical frequency deviation used widely in the optical phase modulation method will be described.

Each of FIG. 8 and FIG. 9 shows a configuration of a compensation circuit compensating the optical phase deviation and the optical frequency deviation. Here, the compensation circuit compensating the optical phase deviation and the optical frequency deviation may be denoted as "compensation circuit" in some cases. A compensation circuit 201 shown in FIG. 8 is called the feed forward type and a compensation circuit 301 shown in FIG. 9 is called the feedback type. The feed forward type compensation circuit carries out the phase compensation of an output signal so that the phase deviation detected from an input signal may be cancelled. The feedback type compensating circuit carries out the phase compensation of an input signal so that a phase deviation detected from an output signal may become small. The operation to detect the phase deviation is basically common to both the compensation circuits. Accordingly, as an example of the compensation circuit, the feed forward type compensation circuit 201 shown in FIG. 8 will be described in the following.

According to FIG. 8, an input signal input to the compensation circuit 201 is branched in two directions, and one branched input signal is input to a phase compensation amount estimating unit 100, and the other branched signal is input to a compensation executing unit 101.

The phase compensation amount estimating unit 100 includes a phase error detecting part 102, a filter part 103 and a phase compensation amount calculating part 104. The phase error detecting part 102 detects a change of the optical phase deviation per a unit time, that is, a change in the optical phase deviation between two adjacent symbols. As algorithm for detecting the change in the optical phase deviation in the optical coherent reception method, for example, the M-th Power Algorithm is known. Since the configuration and the procedure for applying the M-th Power Algorithm to the optical coherent reception method are known widely, detailed description is omitted.

An output of the phase error detecting part 102 is sent to the filter part 103. The filter part 103 removes a noise component from the output of the phase error detecting part 102. An output of the filter part 103 is sent to the phase compensation amount calculating part 104. The phase compensation amount calculating part 104 calculates the actual amount of phase compensation, that is, the amount of rotation of the constellation. For example, the phase compensation amount calculating part 104 is an integration circuit.

The compensation executing unit 101 carries out the phase compensation, that is, the phase rotation whose amount is corresponding to the amount of phase compensation detected by the phase compensation amount estimating unit 100, by executing a complex multiplication so that the detected optical phase deviation may be small, and outputs a signal whose phase has been compensated, as an output signal. Specifically, the compensation executing unit 101 outputs a product of the input signal and a complex value (expressed by $\exp(-i\phi)$) which means reverse rotation by $\phi$, where $\phi$ is the calculated phase deviation. In this way, the phase deviation of the input signal is compensated.

Here, the change in the optical phase deviation between two adjacent symbols is equal to a product of the optical frequency deviation and one symbol time (one symbol time is equal to a reciprocal of a symbol rate), and one symbol time is fixed. For this reason, by the compensation circuit 201's calculating the optical frequency deviation on the basis of the optical phase deviation, and making the phase of the input signal rotated so as to compensate the calculated optical frequency deviation, it is possible to make the compensation executing unit 101 compensate the optical frequency deviation. That is, by adding a procedure in which the phase compensation amount estimating unit 100 calculates the optical frequency deviation on the basis of the optical phase deviation, it is also possible that the compensation circuit 201 compensates the optical frequency deviation.

As described above, according to the optical communication system based on the optical phase modulation method, by compensating rotation of the constellation by use of the compensation circuit 201 or 301 shown in FIG. 8 or FIG. 9 respectively, it is possible to regenerate the transmission data on the basis of the phase-modulated signal data. Since the compensation circuits 201 and 301 shown in FIG. 8 and FIG. 9 respectively are generally realized by carrying out the digital signal processing, the optical phase modulation method is often called the optical digital coherent method.

Meanwhile, as an art which realizes the ultra high speed optical communication system, the optical polarization multiplexing/demultiplexing art is also noted. An optical transmitter is based on the optical polarization multiplexing/demultiplexing art, modulates two independent optical carrier waves which have the same frequency band and whose polarization states are orthogonal to each other, with two different optical signals, and carries out the polarization multiplexing scheme and transmits the polarization-multiplexed signal. Moreover, an optical receiver based on the optical polarization multiplexing/demultiplexing art regenerates two independent signal data by demultiplexing the carrier waves whose polarization states are orthogonal to each other and as the result, the optical receiver makes it possible to realize a double transmission rate. Or, since it is possible to lower the symbol rate (baud rate) up to half of the bit rate of the transmission data by use of the optical polarization multiplexing/demultiplexing art, it is possible to reduce the operation speed of the electric device. For this reason, it may be proper to say that the optical polarization multiplexing/demultiplexing art is an art which can reduce an apparatus cost, among the optical communication systems of the identical symbol rate.

By combining the optical phase modulation method and the optical polarization multiplexing/demultiplexing art described above, it is possible to realize the ultra high speed optical communication system such as, for example, 100 Gbps system. Furthermore, an art to demodulate a received optical signal with accuracy by carrying out a process of compensating the optical frequency deviation, and the optical phase deviation and a process of demultiplexing the polarizations by use of a digital signal processing circuit installed in LSI (Large Scale Integration) or the like, is proposed.

A configuration that an optical receiver of the optical communication system based on a combination of the optical phase modulation method and the optical polarization multiplexing/demultiplexing art, uses the above-mentioned compensation circuit will be described with reference to FIG. 10 and FIG. 11. FIG. 10 shows a configuration of the feed forward type compensation circuit used widely in the optical digital coherent reception method. Moreover, FIG. 11 shows a detailed configuration of optical frequency deviation compensating circuits 201-1 and 201-2 shown in FIG. 10.

A polarization multiplexing optical signal input into the optical receiver, is polarization-demultiplexed into a X polarization wave and a Y polarization wave orthogonal to each other, by a 90 degrees hybrid (not shown in the figure) of a front end unit of the optical receiver. Then, optical signals of each polarization are mixed with a local light to generate beat signals. Here, since two polarization planes of the input polarization multiplexing light are generally not identical with the polarization planes of the 90 degrees hybrid, each of the beat signals includes both of the multiplexed polarization signals. A polarization demultiplexing circuit 200 shown in FIG. 10 and FIG. 11 demultiplexes the beat signals (X polarization input signal (A) and Y polarization input signal (A)) into signal data corresponding to two optical carrier waves whose polarizations are orthogonal to each other. As signal processing algorithm used in the polarization demultiplexing circuit 200, for example, CMA (Constant Modulus Algorithm) is known. Since a procedure for applying CMA to the polarization demultiplexing process is well known and has no direct relation to the configuration of the present invention, description on the procedure is omitted.

The signal data polarization-demultiplexed by the polarization demultiplexing circuit 200 are input to the optical frequency deviation compensating circuits 201-1 and 201-2 respectively to compensate rotation of the constellation. As shown in FIG. 11, the optical frequency deviation compensating circuits 201-1 and 201-2 include compensation amount estimating units 100-1 and 100-2, and compensation executing units 101-1 and 101-2 respectively. Each of the compensation amount estimating units 100-1 and 100-2 calculates the amount of carrier frequency compensation by calculating the optical frequency deviation on the basis of the optical phase deviation similarly to the phase compensation amount estimating unit 100 described in FIG. 8. Then, the compensation executing units 101-1 and 101-2 compensate the phases of the signal data input to the optical frequency deviation compensating circuits 201-1 and 201-2 respectively on the basis of the calculated amounts of carrier frequency compensation.

That is, the optical frequency deviation compensating circuits 201-1 and 201-2 compensate rotation of the constellation caused by a frequency difference (that is, wavelength difference) between a light source of the optical transmitter and the local light of the optical receiver.

The signal data whose optical frequency deviations are compensated are input to optical phase deviation compensating circuits 202-1 and 202-2 respectively. The optical phase deviation compensating circuits 202-1 and 202-2 compensate fluctuation of the constellation which is not caused by the optical frequency deviation, and which is caused, for example, by fluctuation of the phase of the light source of the optical transmitter, or fluctuation of the phase of the local light of the optical receiver. Since operation of the optical phase deviation compensating circuits 202-1 and 202-2 for compensating the phase deviation are similar to the operation of the compensation circuit 201 shown in FIG. 8, description on the operation is omitted.

As mentioned above, the feed forward type compensation circuit shown in FIG. 10 and FIG. 11 which uses a combination of the optical phase modulation method and the optical polarization multiplexing/demultiplexing art, compensates the optical frequency deviation and the optical phase deviation of each of two independent optical signals obtained by the polarization demultiplexing. As a result, it is possible that the feed forward type compensation circuit shown in FIG. 10 and FIG. 11 realizes an ultra high speed optical communication system such as a 100 Gbps system.

Here, a patent document 1 and a patent document 2 related to the present invention, disclose an art of carrying out correction of a phase of an optical phase-modulation signal and demodulation of the phase-modulation signal.

CITATION LIST

Patent Document

Patent document 1: Japanese Patent Application Laid-Open Publication No. 2009-194784
Patent document 2: Japanese Patent Application Laid-Open Publication No. 2010-193204

DISCLOSURE OF THE INVENTION

Problem to be Solved by the Invention

The optical phase modulation method which uses a large number of signal levels, for example, 16 QAM (quadrature amplitude modulation) has a tendency to suffer from influence of noise. For this reason, a transmission waveform of a signal modulated on the basis of the optical phase modulation method which uses a large number of the signal levels, has a tendency to be degraded by the noise added through the long-haul transmission. In the case that the transmission waveform is degraded, an error is caused in a result of calculating the amount of phase deviation compensation in the optical receiver. As a result, the above-mentioned art related to the present invention has a problem that it may be impossible to compensate rotation of the constellation with accuracy, and consequently impossible to regenerate data normally in some cases. However, the patent document 1 and the patent document 2 do not disclose a configuration to solve the problem.

An object of the present invention is to provide an art which solves a problem of reducing the influence of noise due to the phase deviation and estimating an amount of phase compensation with superior accuracy.

Solution to the Problem

A signal processing circuit according to the present invention includes: optical frequency deviation estimating means for inputting a plurality of signal data that are generated by mixing a plurality of optical carrier waves with a local light, which optical carrier waves are phase-modulated and have polarizations able to be demultiplexed from each other, and that corresponds to the polarizations of each of the optical carrier waves, for estimating a frequency deviation which is included in each of the plurality of input signal data and is a difference between a frequency of the optical carrier wave and a frequency of the local light, per the signal data, and for outputting the estimated frequency deviation as an estimated value; optical frequency deviation compensation amount analyzing means for calculating an amount of frequency compensation which is an amount of compensation to make a phase of the signal data rotated so as to reduce the frequency deviation, on the basis of a plurality of the estimated values estimated per the signal data; optical frequency deviation compensating means for making the phase of the signal data rotated correspondingly to the amount of the frequency compensation; optical phase deviation estimating means for estimating a phase deviation included in each the input signal data and is a difference between a phase of the optical carrier wave and a phase of the local light, per the signal data; and optical phase deviation compensating means for making the phase of the signal data rotated correspondingly to the phase deviation.

A signal processing circuit according to the present invention includes: optical frequency deviation estimating means for inputting a plurality of signal data that are generated by mixing a plurality of optical carrier waves with a local light which optical carrier waves are phase-modulated and have polarizations able to be demultiplexed from each other, and that signal data corresponds to the polarizations of the optical carrier waves respectively, and for estimating a frequency deviation included in each the input signal data and is a difference between a frequency of the optical carrier wave and a frequency of the local light, per the signal data; optical frequency deviation compensating means for making a phase of the signal data rotated correspondingly to the frequency deviation; optical phase deviation estimating means for estimating a phase deviation included in each the input signal data and which is a difference between a phase of the optical carrier wave and a phase of the local light, per the signal data, and for outputting the estimated phase deviation as an estimated value; optical phase deviation amount compensation analyzing means for calculating an amount of phase compensation which is an amount of compensation to make the phase of the signal data rotated so as to reduce the phase deviation, on the basis of a plurality of the estimated values estimated per the signal data; and optical phase deviation compensating means for making the phase of the signal data rotated correspondingly to the amount of phase compensation.

A signal processing method according to the present invention includes: estimating a frequency deviation per signal data, that is included in a plurality of signal data and is a difference between a frequency of optical carrier wave and a frequency of local light, which signal data are generated by mixing a plural of the optical carrier waves with the local light and corresponds to polarizations of the optical carrier waves respectively and which optical carrier waves are phase-modulated and have polarizations able to be demultiplexed from each other, and calculating an amount of frequency compensation which is an amount of compensation to make a phase of the signal data rotated so as to reduce the frequency deviation, on the basis of a plurality of the estimated values estimated per the signal data; making the phase of the signal data rotated correspondingly to the amount of the frequency compensation; estimating a phase deviation included in each the input signal data and which is a difference between a phase of the optical carrier wave and a phase of the local light, per the signal data; and making the phase of the signal data rotated correspondingly to the phase deviation.

A signal processing method according to the present invention includes: estimating a frequency deviation per signal data, that is included in a plurality of signal data and is a difference between a frequency of optical carrier wave and a frequency of local light, which signal data are generated by mixing a plural of the optical carrier waves with the local light and corresponds to polarizations of the optical carrier waves respectively and which optical carrier waves are phase-modulated and have polarizations able to be demultiplexed from each other, and making a phase of the signal data rotated correspondingly to the frequency deviation; estimating a phase deviation included in each of the signal data and which is a difference between a phase of the optical carrier wave and a phase of the local light, per the signal data, and outputting the estimated phase deviation as an estimated value; calculating an amount of phase compensation which is an amount of compensation to make the phase of the signal data rotated so as to reduce the phase deviation, on the basis of a plurality of the values estimated per the signal data; and making the phase of the signal data rotated correspondingly to the amount of the phase compensation.

A signal processing circuit according to the present invention includes: optical phase deviation compensation amount analyzing means for inputting a plurality of signal data that are generated by mixing a plurality of optical carrier waves with a local light, which optical carrier waves are phase-modulated and have polarizations able to be demultiplexed from each other, and that corresponds to the polarizations of each of the optical carrier waves, and for calculating an amount of phase compensation which is used for making a phase of the signal data except for a first signal data out of the input plural signal data rotated so as to reduce a frequency deviation between a frequency of the optical carrier wave and a frequency of the local light, on the basis of the first signal data.

A signal processing method according to the present invention includes: calculating an amount of phase compensation used for making a phase of signal data except for a first signal data out of plural signal data which signal data are generated by mixing a plurality of the optical carrier waves with the local light and corresponds to polarizations respectively which optical carrier waves are phase-modulated and have polarizations able to be demultiplexed from each other, rotated so as to reduce a phase deviation between a frequency of an optical carrier wave and a frequency of a local light, on the basis of the first signal data.

Advantageous Effect of the Invention

The present invention has an effect that the present invention makes it possible to reduce influence of noise which is caused by a phase deviation and to calculate an amount of phase compensation with superior accuracy.

BEST MODE FOR CARRYING OUT THE INVENTION (First Exemplary Embodiment)

Figure 8:
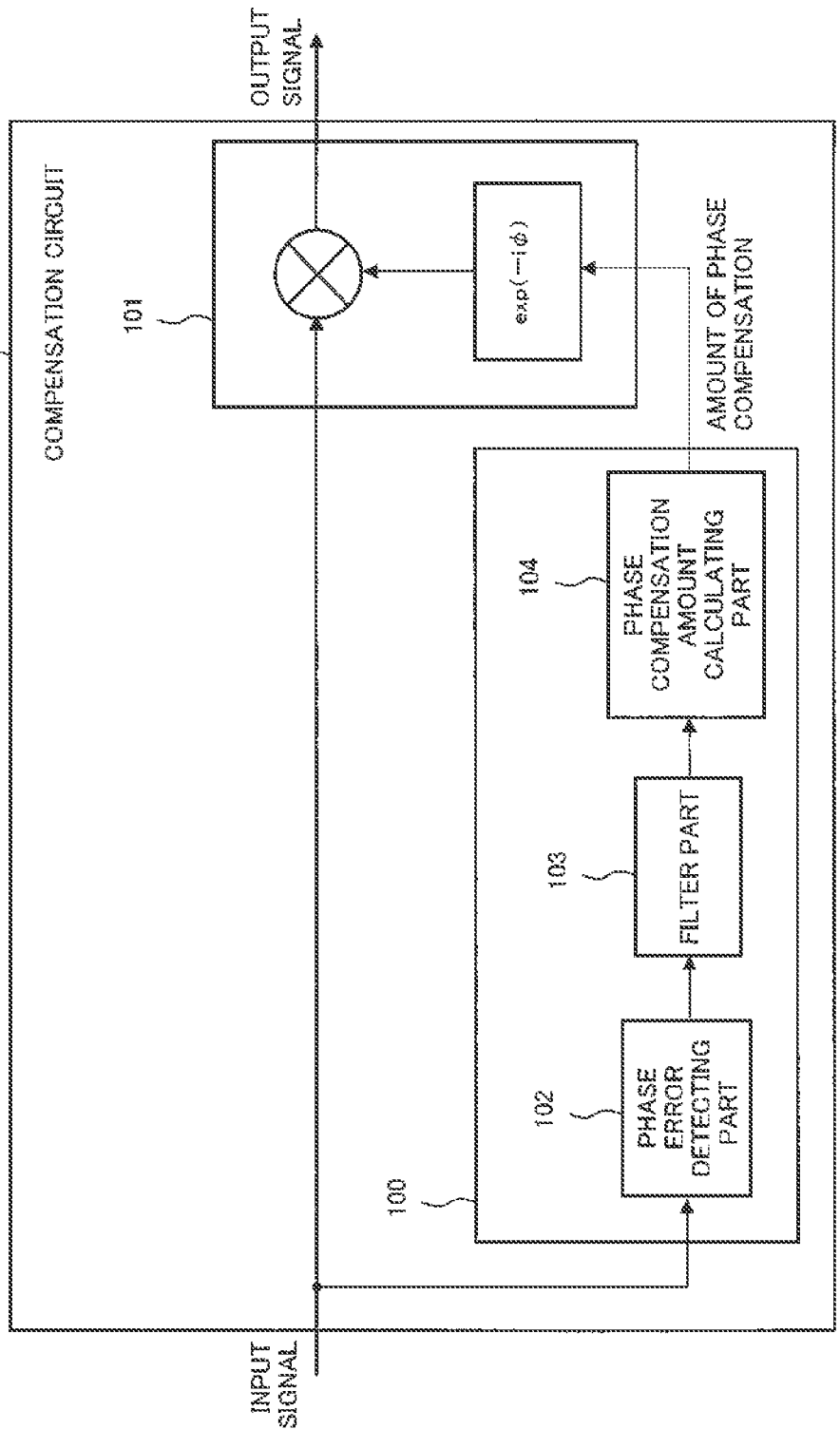
[FIG. 8] A diagram showing a configuration of a feed forward type optical phase deviation and optical frequency deviation compensating circuit
Figure 9:
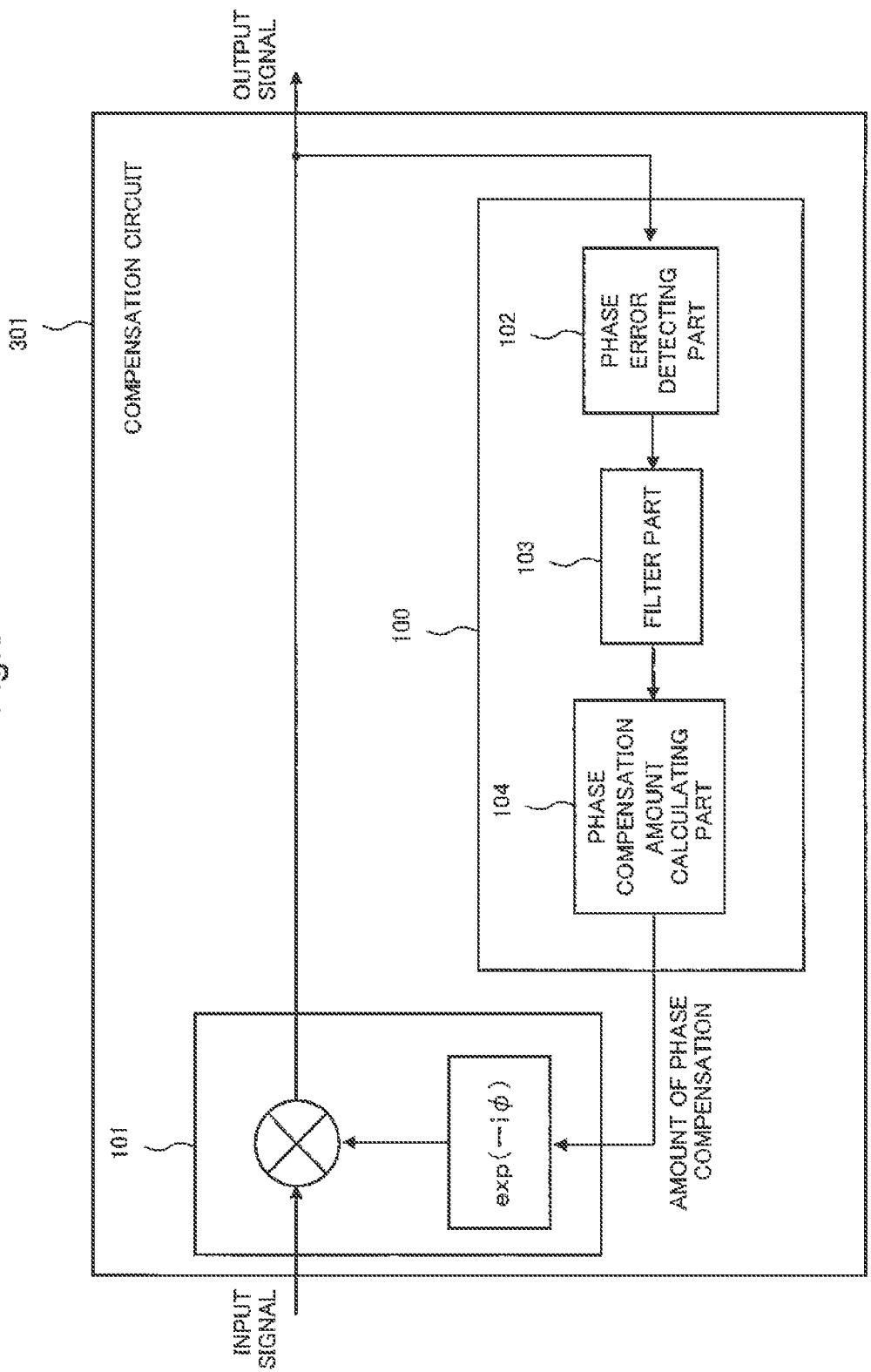
[FIG. 9] A diagram showing a configuration of a feedback type optical phase deviation and optical frequency deviation compensating circuit
Figure 10:
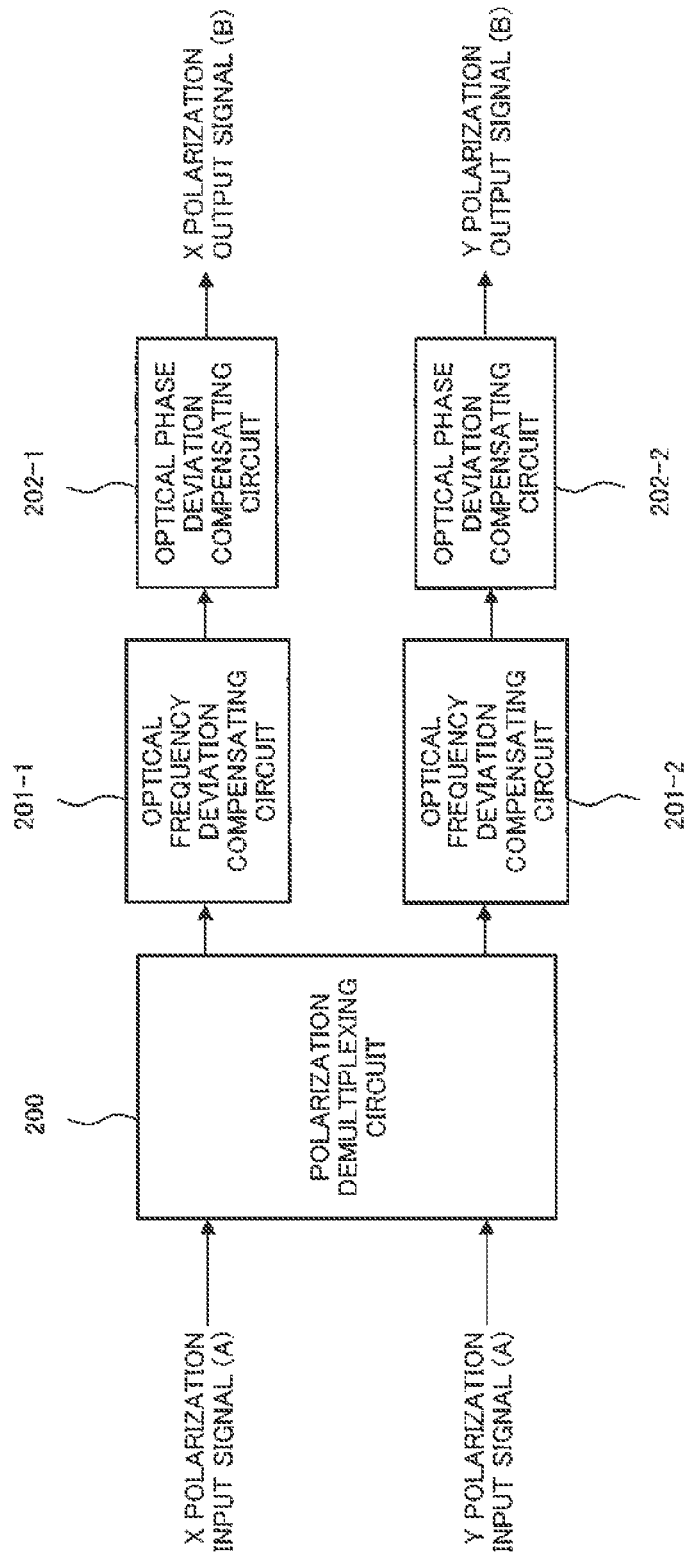
[FIG. 10] A diagram showing a configuration of a feed forward type compensation circuit

Hereinafter, a first exemplary embodiment according to the present invention will be described in detail with reference to drawings. Here, the same reference sign as the components shown in FIG. 8 to FIG. 10 is assigned to the components which has the same function of the component shown in FIG. 8 to FIG. 10, and the description of the components may be omitted in some cases.

Figure 12:
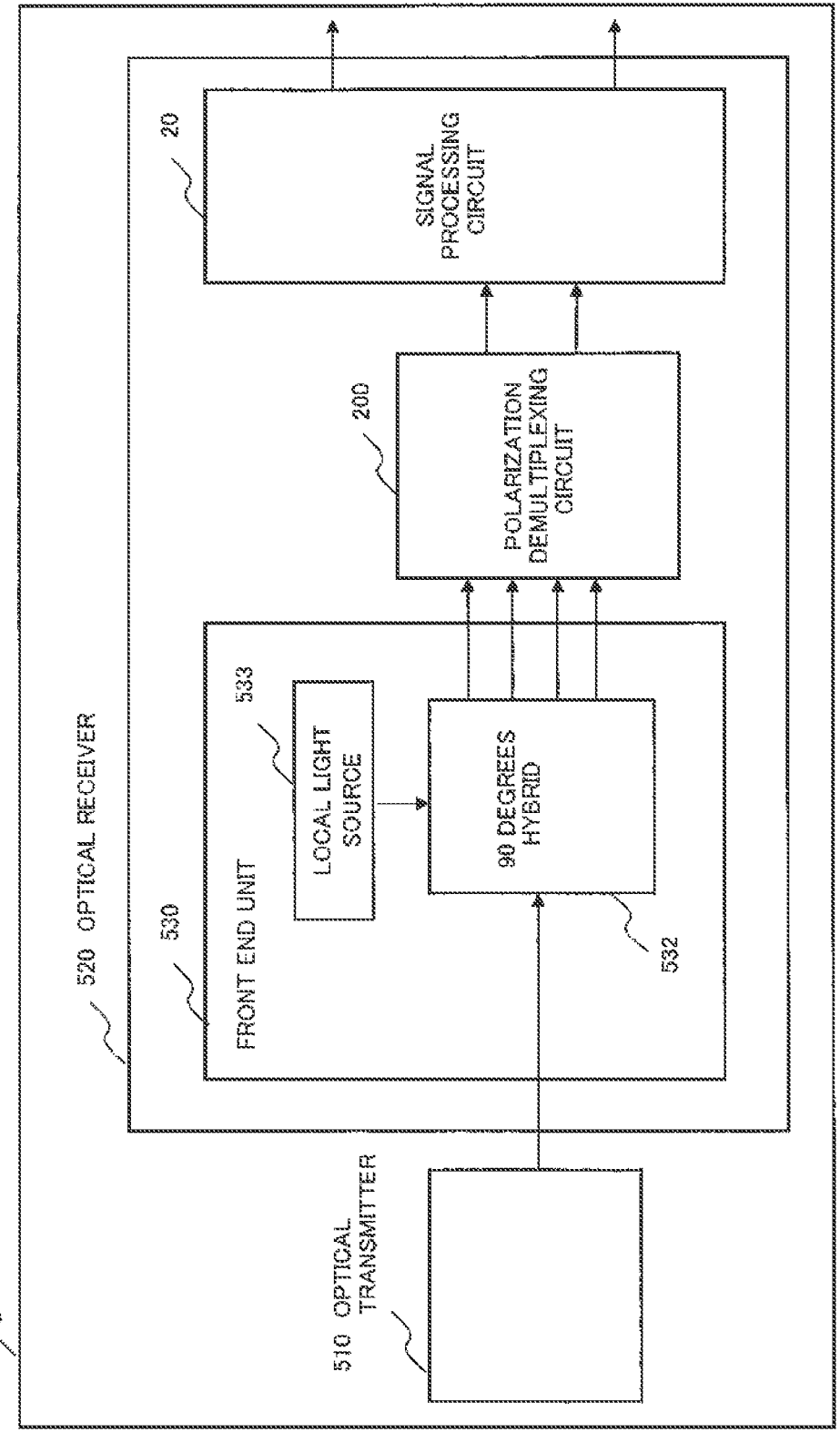
[FIG. 12] A diagram showing a configuration of an optical communication system according to the first exemplary embodiment of the present invention

FIG. 12 shows a configuration of an optical communication system according to the first exemplary embodiment of the present invention. An optical communication system 500 shown in FIG. 12 includes an optical transmitter 510 and an optical receiver 520.

The optical transmitter 510 phase-modulates a plurality of optical carrier waves which have polarization planes able to be demultiplexed from each other, by different data respectively and transmits the phase-modulated optical carrier waves. Hereinafter, a configuration that the optical transmitter transmits two optical carrier waves whose polarization planes are orthogonal to each other will be described.

The optical receiver 520 is arranged so as to receive the phase-modulated optical carrier waves which the optical transmitter 510 transmits. The optical receiver 520 includes a front end unit 530, the polarization demultiplexing circuit 200 and a signal processing circuit 20. The front end unit 530 includes a 90 degrees hybrid 532 and a local light source 533.

The optical receiver 520 which has the above-mentioned configuration receives the phase-modulated optical carrier waves which the optical transmitter 510 transmits. Then, the optical receiver 520 demultiplexes the polarizations of the received optical carrier waves by use of the polarization demultiplexing circuit 200 and compensates a constellation per the demultiplexed polarization.

The optical signal received by the optical receiver 520 is mixed with a local light output from the local light source 533, by the 90 degrees hybrid 532 and consequently four beat signals are generated. These beat signals correspond to real parts and imaginary parts of optical signals parallel to the polarization planes of the 90 degrees hybrid orthogonal to each other. Here, since a configuration of the front end unit 530 used for mixing the phase-modulated optical signal with the local light and generating the beat signal, is well known in the optical coherent reception method, detailed description is omitted.

Four beat signals corresponding to the real parts and the imaginary parts of an X polarization and a Y polarization output by the 90 degrees hybrid shown in FIG. 12, are input to the polarization demultiplexing circuit 200 as a complex value signal.

Here, in the case that the polarization multiplexing light is input to the 90 degrees hybrid 532, two polarization planes of the optical carrier waves of the polarization multiplexing light and the polarization planes which the 90 degrees hybrid 532 demultiplexes are not generally identical with each other. For this reason, each of the beat signals includes both of signal data of two polarization-multiplexed optical carrier waves.

The polarization demultiplexing circuit 200 demultiplexes these beat signals into two signal data corresponding to the polarizations of the optical carrier waves multiplexed in the optical transmitter. Then, the polarization demultiplexing circuit 200 outputs the signal data demultiplexed correspondingly to the polarizations (X polarization and Y polarization) of the optical carrier waves, to the signal processing circuit 20. Here, it may be preferable that the polarization demultiplexing circuit 200 uses CMA mentioned above as algorithm for the polarization-demultiplexing.

The signal data demultiplexed by the polarization demultiplexing circuit 200 are input to the signal processing circuit 20 as an X polarization input signal and a Y polarization input signal. By rotating a phase of the input signal, the signal processing circuit 20 compensates a frequency deviation and a phase deviation between the local light and the optical carrier wave which the optical transmitter 510 transmits, and restores the constellation at a time of the modulation. Hereinafter, a configuration and an operation of the signal processing circuit 20 will be described in detail.

Figure 1:
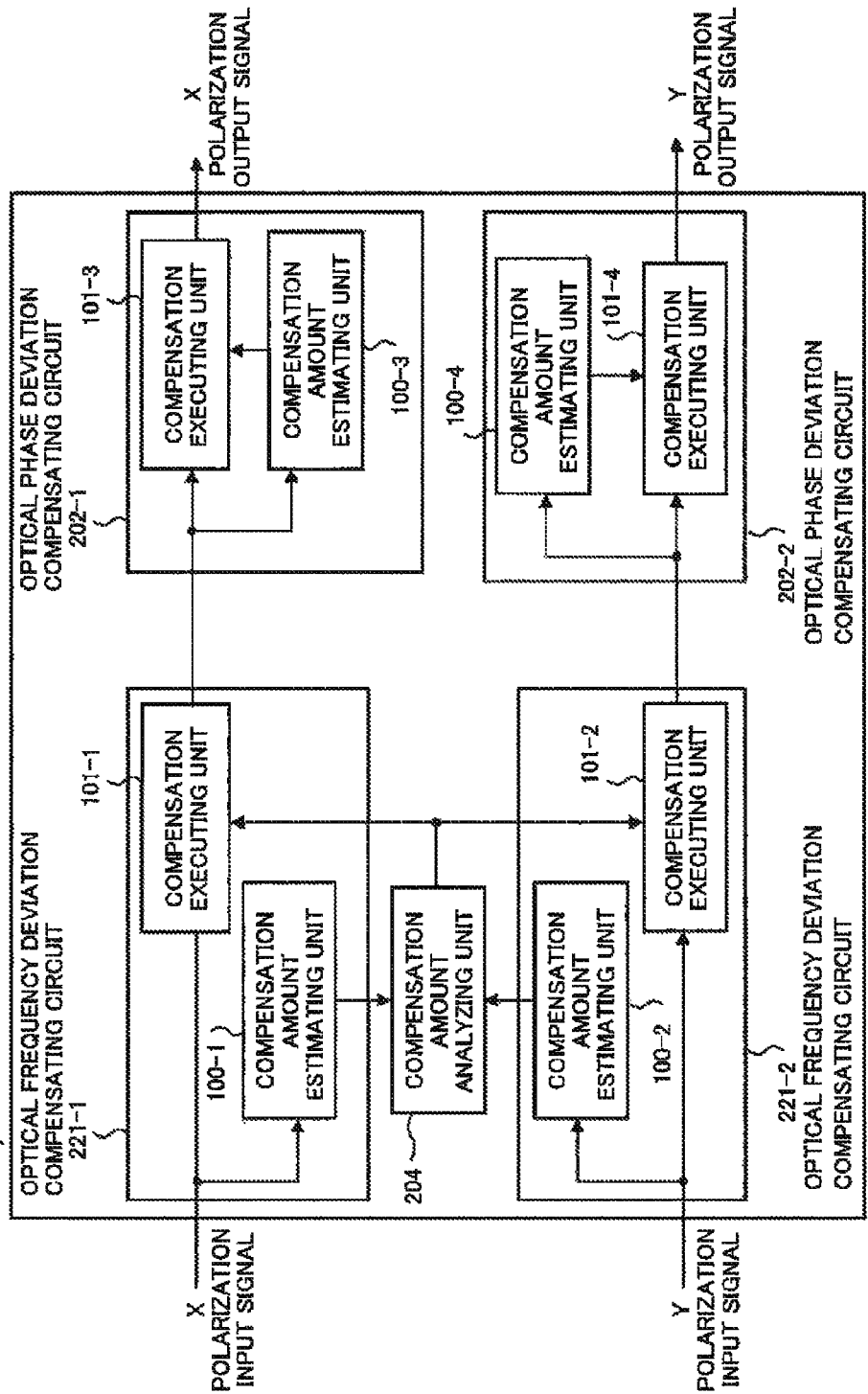
[FIG. 1] A block diagram showing a configuration of a signal processing circuit according to a first exemplary embodiment of the present invention

FIG. 1 shows the configuration of the signal processing circuit 20 according to the first exemplary embodiment of the present invention. As shown in FIG. 1, the signal processing circuit 20 includes optical frequency deviation compensating circuits 221-1 and 221-2, the optical phase deviation compensating circuits 202-1 and 202-2 and a compensation amount analyzing unit 204.

Moreover, the optical frequency deviation compensating circuit 221-1 includes the compensation amount estimating unit 100-1 and the compensation executing unit 101-1. Similarly, the optical frequency deviation compensating circuit 221-2 includes the compensation amount estimating unit 100-2 and the compensation executing unit 101-2.

Moreover, the optical phase deviation compensating circuit 202-1 includes a compensation amount estimating unit 100-3 and a compensation executing unit 101-3. The optical phase deviation compensating circuit 202-2 includes a compensation amount estimating unit 100-4 and a compensation executing unit 101-4.

The beat signals demultiplexed into the signal data per the polarization of the optical carrier wave by the polarization demultiplexing circuit 200 are input into the optical frequency deviation compensating circuits 221-1 and 221-2 as an X polarized wave input signal and a Y polarized wave input signal respectively. Each of the optical frequency deviation compensating circuits 221-1 and 221-2 compensates rotation of a constellation caused by a wavelength difference (frequency difference) between the optical carrier wave which the optical transmitter 510 generates, and the local light which the local light source 533 generates.

A configuration and a work of the compensation amount estimating unit 100-1 of the optical frequency deviation compensating circuit 221-1 are similar to ones of the phase compensation amount estimating unit 100 shown in FIG. 8. That is, as shown in FIG. 8, the compensation amount estimating unit 100-1 includes the phase error detecting part 102, the filter part 103 and the phase compensation amount calculating part 104. Then, the compensation amount estimating unit 100-1 calculates an optical frequency deviation on the basis of an optical phase deviation of the signal data input to the optical frequency deviation compensating circuit 221-2. Then, the compensation amount estimating unit 100-1 calculates an amount of phase compensation used for compensating the optical frequency deviation of the signal data, as an estimated value. Also the compensation amount estimating unit 100-2 calculates an amount of phase compensation used for compensating the optical frequency deviation of the signal data input to the optical frequency deviation compensating circuit 221-2, on the basis of the same procedure as the compensation amount estimating unit 100-1, as an estimated value.

Here, it may be preferable that the compensation amount estimating units 100-1 and 100-2 use the M-th Power Algorithm as the algorithm for detecting the optical phase deviation.

The estimated values estimated by the compensation amount estimating units 100-1 and 100-2 are sent to the compensation amount analyzing unit 204. Then, the compensation amount analyzing unit 204 calculates a new amount of compensation on the basis of the estimated values. The compensation amount analyzing unit 204 outputs the amount of compensation calculated newly to the compensation executing units 101-1 and 101-2.

Each of the compensation executing units 101-1 and 101-2 compensates the optical frequency deviation by making a phase of the input signal rotated on the basis of the new amount of optical frequency deviation compensation calculated in this way.

The signal data input to the optical frequency deviation compensating circuits 221-1 and 221-2 are received at an identical time by the optical receiver. Accordingly, it may be proper to think that these optical frequency deviations are almost identical with each other. However, in some cases, the estimated value of the amount of compensation may include an error caused by influence of noise when each of the compensation amount estimating units 100-1 and 100-2 estimates the amount of compensation. The error of the estimated value of the amount of compensation causes an error in the amount of phase rotation executed by the compensation executing unit. As a result, there is a possibility that the symbol may not be regenerated correctly since the constellation is not compensated correctly. Accordingly, it is preferable that the error includes in the estimated value of the amount of compensation is as little as possible.

The compensation amount analyzing unit 204 calculates the amount of phase rotation on the basis of the amounts of compensation estimated by the compensation amount estimating units 100-1 and 100-2. Here, it may be preferable that the amount of compensation analyzing unit 204 not only uses the amounts of compensation estimated by the compensation amount estimating units 100-1 and 100-2, but also uses optionally the signal data used for estimating the amount of compensation, or data calculated in the estimation process, for calculating the amount of phase rotation.

As mentioned above, the compensation amount analyzing unit 204 estimates the amount of compensation on the basis of both the output data of the compensation amount estimating units 100-1 and 100-2. As a result, the signal processing circuit 20 can reduce the influence of noise and improve accuracy in estimating the amount of frequency deviation compensation.

It may be preferable that the compensation amount analyzing unit 204 carries out a process of averaging the estimated values of the amount of compensation, output by the compensation amount estimating units 100-1 and 100-2, as the simplest method for estimating the amount of compensation. Since noise components added to both the signals have no mutual correlation, the influence of noise is suppressed by averaging the estimated values. Here, it may be preferable that the compensation amount analyzing unit 204 estimates the amount of compensation by use of a procedure other than the averaging procedure.

Furthermore, it may be preferable that the compensation amount analyzing unit 204 uses a method described below, as another method for estimating the amount of compensation. That is, the compensation amount analyzing unit 204 monitors the estimated values of the amount of compensation output by the compensation amount estimating units 100-1 and 100-2. In the case that the estimated value of the amount of compensation of one compensation amount estimating unit indicates behavior which fluctuates substantially from the past estimated values of the amount of compensation, and from the estimated value of the amount of compensation of the other compensation amount estimating unit, it may be preferable to carry out a process of adopting the estimated values before the last estimated value, or the other estimated value of the amount of compensation preferentially. The movement that the estimated value of the amount of compensation fluctuates on an unnaturally substantial scale is likely to be caused by a failure of the process of estimating the frequency deviation due to the influence of noise. Then, in the case that the estimation value of the amount of compensation suffers from an erroneous phase change not smaller than $\pi/2$ due to the failure of the process of estimating the frequency deviation, there is a fear that rotation of the constellation called the phase slip is generated and consequently an error will be caused in a following symbol regenerating process. However, by monitoring the estimated value of the compensation amount analyzing unit 204 as mentioned above, it is possible to prevent a phenomenon called the phase slip mentioned above.

Here, operation of the optical phase deviation compensating circuits 202-1 and 202-2 are similar to one of the compensation circuit 201 described previously with reference to FIG. 8. That is, the optical phase deviation compensating circuits 202-1 and 202-2 can compensate fluctuation of the constellation caused, for example, by fluctuation of the phase of the light source of the optical transmitter, or fluctuation of the phase of the local light of the optical receiver. Then, the optical frequency deviation compensating circuits 202-1 and 202-2 output an X polarization output signal and a Y polarization output signal obtained by compensating the optical frequency deviation and the optical phase deviation of the X polarization input signal and the Y polarization input signal respectively.

Figure 2:
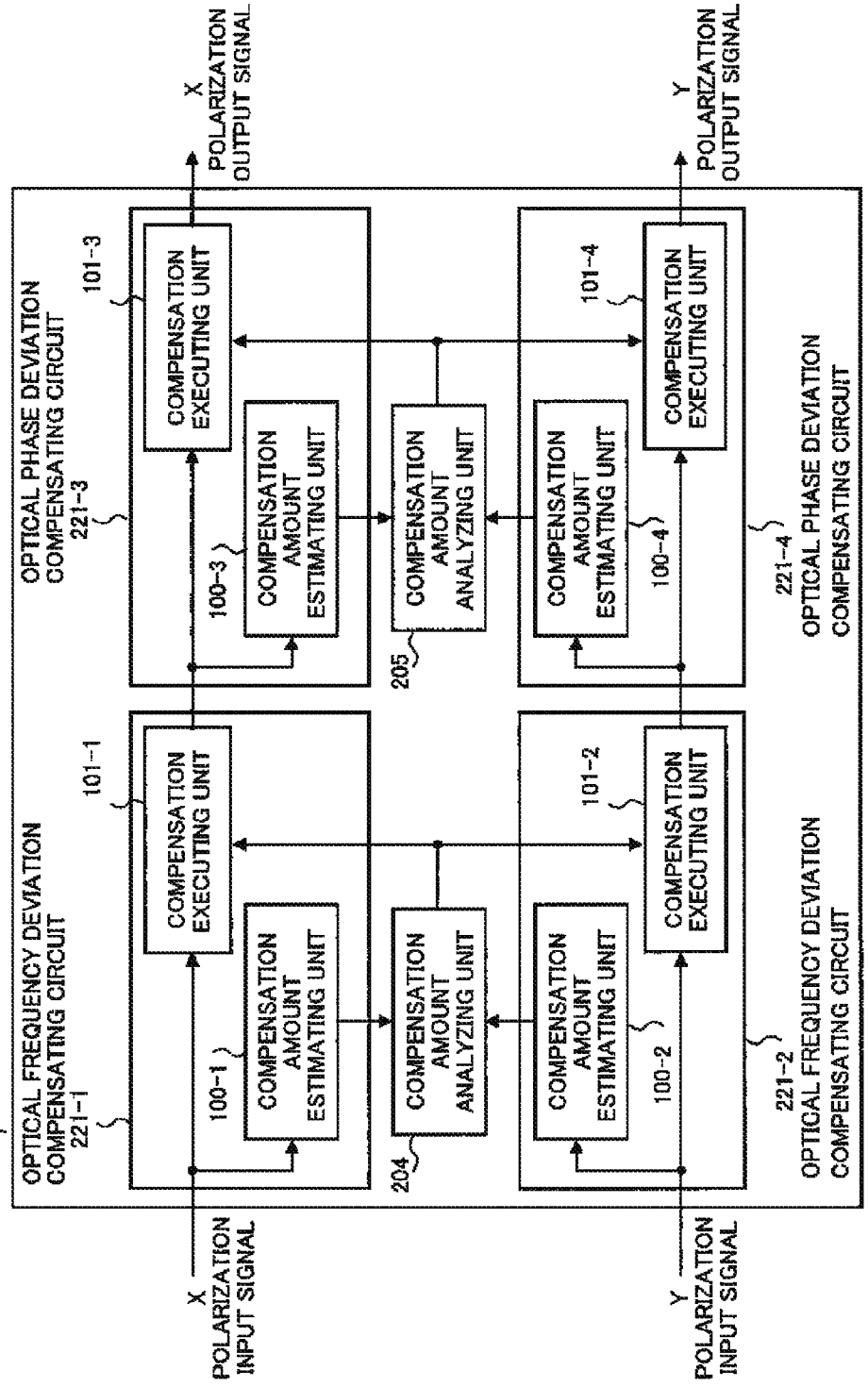
[FIG. 2] A block diagram showing a signal processing circuit according to a first modification of the first exemplary embodiment of the present invention

FIG. 2 exemplifies a first modification of the signal processing circuit according to the first exemplary embodiment. According to a signal processing circuit 21 shown in FIG. 2, the configurations of the optical frequency deviation compensating circuits 221-1 and 221-2 are applied to optical phase deviation compensating circuits 221-3 and 221-4 respectively.

The signal processing circuit 21 shown in FIG. 2 furthermore includes a compensation amount analyzing unit 205 in comparison with the signal processing circuit 20 shown in FIG. 1. In the signal processing circuit 21, the amounts of phase compensation, estimated by the compensation amount estimating units 100-3 and 100-4 respectively, are sent to the compensation amount analyzing unit 205. Then, a new amount of phase compensation calculated by the compensation amount analyzing unit 205 is supplied to the compensation executing units 101-3 and 101-4.

That is, the optical phase deviation compensating circuits 221-3 and 221-4 of the signal processing circuit 21 in FIG. 2 calculate the new amount of phase compensation on the basis of both the estimated values of the amount of phase compensation estimated by the compensation amount estimating units 100-3 and 100-4. By changing the configuration of the optical phase deviation compensating circuits 202-1 and 202-2 shown in FIG. 1 in this way, also the optical phase deviation compensating circuit can reduce the influence of noise and improve accuracy in estimating the amount of phase deviation compensation.

Figure 11:
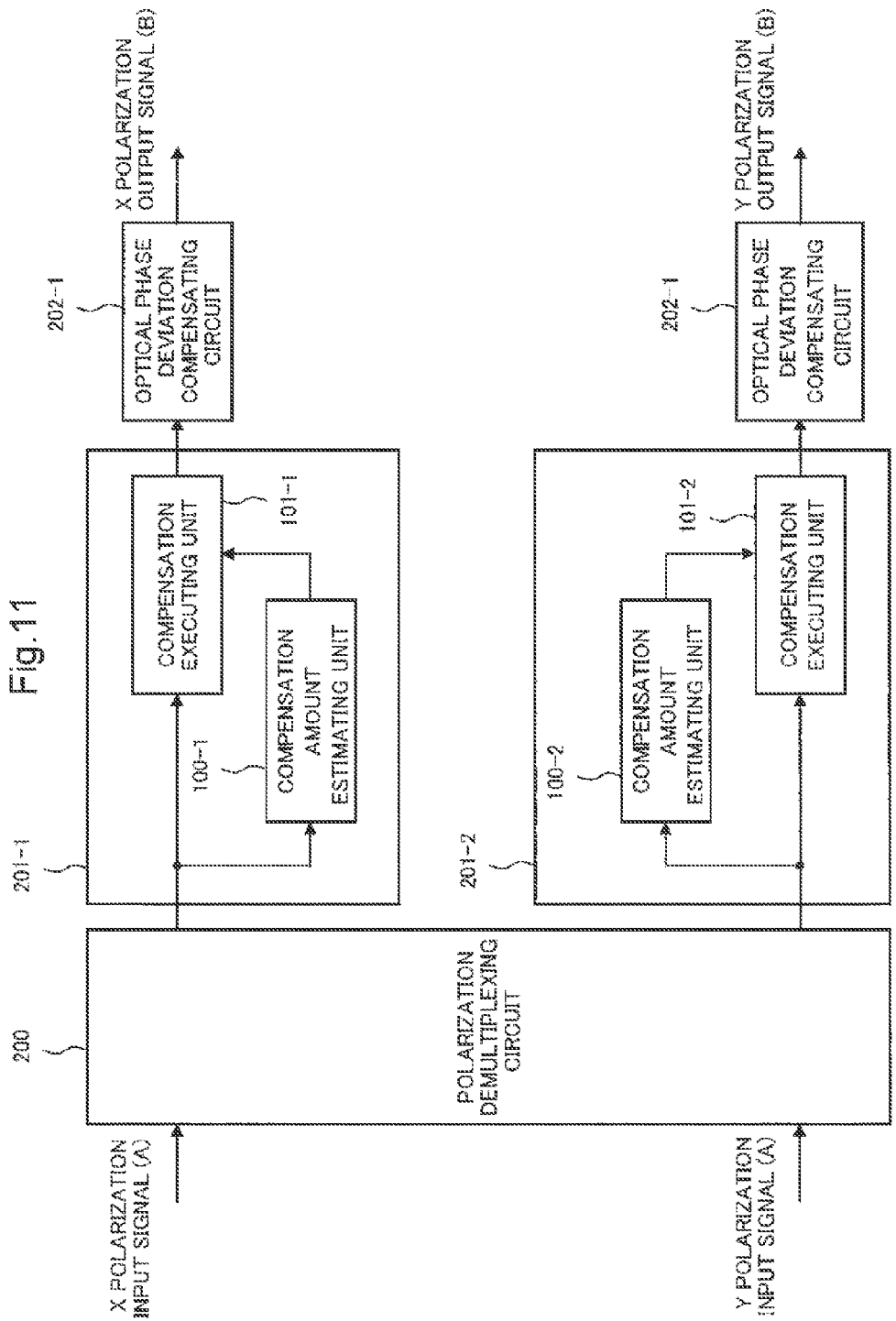
[FIG. 11] A diagram describing a detailed configuration of an inside of the optical frequency deviation compensating circuit
Figure 14:
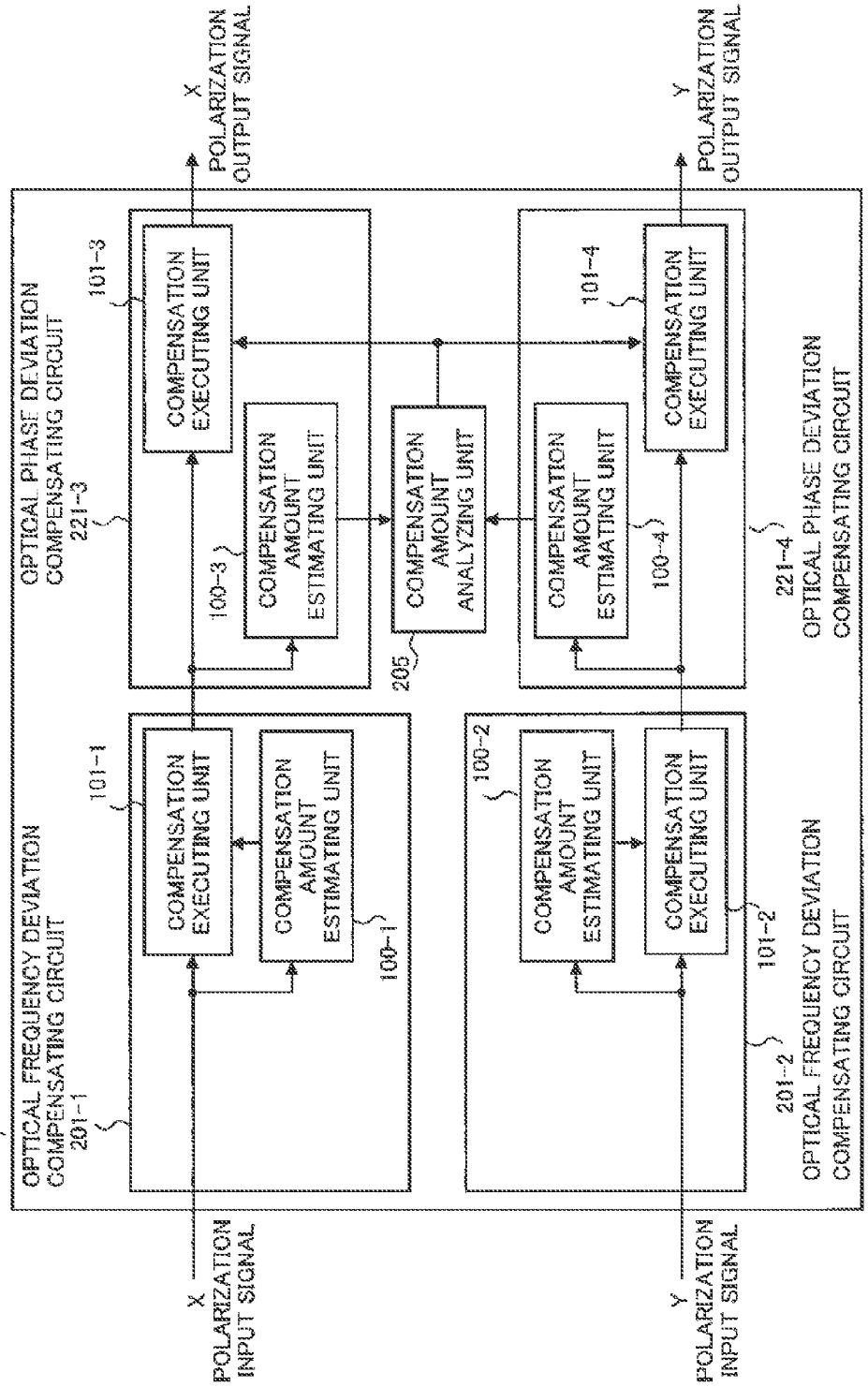
[FIG. 14] A diagram showing a signal processing circuit according to a second modification of the first exemplary embodiment of the present invention

FIG. 14 exemplifies a signal processing circuit according to a second modification of the first exemplary embodiment. A signal processing circuit 22 in FIG. 14 is the same as the signal processing circuit 21 described in FIG. 2 except a point that the optical frequency deviation compensating circuits 221-1 and 221-2 are replaced with the optical frequency deviation compensating circuits 201-1 and 201-2 shown in FIG. 11 respectively.

The signal processing circuit 22 in FIG. 14 includes the optical phase deviation compensating circuits 221-3 and 221-4 shown in FIG. 2. Similarly to the signal processing circuit 21 shown in FIG. 2, the signal processing circuit 22 can reduce the influence of noise on the optical phase deviation compensating circuit and improve accuracy in estimating the amount of phase deviation compensation.

That is, the amount of compensation analyzing unit 205 of the signal processing circuit 22 in FIG. 14 calculates a new amount of phase compensation on the basis of both the estimated values of the amount of phase compensation estimated by the amount of compensation estimating units 100-3 and 100-4. By changing the configuration of the optical phase deviation compensating circuits 202-1 and 202-2 shown in FIG. 1 in this way, the optical phase deviation compensating circuit can reduce the influence of noise and improve accuracy in estimating the amount of phase deviation compensation.

Here, it may be preferable that, similarly to the compensation amount analyzing unit 204 shown in FIG. 1, the compensation amount analyzing unit 205 of the signal processing circuits 21 and 22 uses a method described below as another method for estimating the amount of compensation. That is, the compensation amount analyzing unit 205 monitors the estimated values of the amount of compensation estimated by the compensation amount estimating units 100-3 and 100-4. In the case that the estimated value of the amount of compensation of one compensation amount estimating unit indicates behavior which fluctuates substantially from the past estimated values of the amount of compensation, and from the estimated value of the amount of compensation of the other compensation amount estimating unit, it may be preferable to carry out a process of adopting the estimated values including the last estimated value, or the other estimated value of the amount of compensation preferentially. Similarly to the compensation amount analyzing unit 204, by monitoring the estimated value of the amount of compensation at the compensation amount analyzing unit 205 as mentioned above, it is possible to prevent a the phase slip.

Moreover, it may be preferable that the amount of compensation analyzing unit 205 carries out a process of averaging the estimated values of the amount of compensation output by the compensation amount estimating units 100-3 and 100-4. Since noise components added to both the signals have no mutual correlation, the influence of noise is suppressed by averaging the estimated values. Or, it may be preferable that the compensation amount analyzing unit 205 estimates the amount of compensation by use of a procedure other than the averaging procedure.

As mentioned above, according to the first exemplary embodiment, and the first and the second modifications of the first exemplary embodiment, it is possible to reduce the influence of noise and to estimate the amount of compensation more accurately. As a result, it is possible to improve transmission characteristics of the optical communication system.

Here, according to the first exemplary embodiment, it may be preferable that the signal processing circuit 20 includes only the compensation amount estimating units 100-1 and 100-2 and the compensation amount analyzing unit 204. Moreover, it may be preferable that the compensation amount analyzing unit 204 calculates a new amount of phase compensation on the basis of estimation values which the compensation amount estimating units 100-1 and 100-2.

That is, each of the compensation amount estimating units 100-1 and 100-2 estimates the phase deviation which is the difference between the phase of the optical carrier wave and the phase of the local light, per the signal data. The phase deviation mentioned above means the difference between the phase of the local light and the phase of the optical carrier wave, where the phase of the optical carrier wave is included in the signal data generated by mixing a plurality of optical carrier waves phase-modulated with the local light, and that are corresponding to the optical carrier waves respectively.

Moreover, it may be preferable that the compensation amount analyzing unit 204 calculates the amount of phase compensation used for making the phase of the signal data rotated so as to reduce the phase deviation between the phase of the optical carrier wave and the phase of the local light, on the basis of the plural phase deviations which the compensation amount estimating units 100-1 and 100-2 estimate.

By virtue of also the above-mentioned configuration of the signal processing circuit 20, it is possible to obtain an effect that it is possible to reduce the influence of noise on the estimated value of the phase deviation and to improve accuracy in calculating the amount of phase compensation.

(Second Exemplary Embodiment)

Next, a signal processing circuit according to a second exemplary embodiment of the present invention will be described.

The arts described in the patent document 1 and the patent document 2 have a problem that a scale of circuit increases as described below.

Generally, a clock rate for working LSI is about several hundreds of MHz to 1 GHz. For this reason, it is necessary to arrange circuits in parallel in LSI in order to process a high-speed signal used in the optical communication, for example, a 100 Gbps signal. However, since number of the parallel circuits becomes very large in the case of processing the high speed signal, a circuit scale and electric power consumption of LSI are increased.

Moreover, in the case of an optical communication system which uses the optical polarization multiplexing/demultiplexing art, number of operations for carrying out the signal processing per an unit time becomes double in comparison with a case of not using the optical polarization multiplexing/demultiplexing art. From the view point mentioned above, a scale of the LSI circuit is increased.

An object of the second exemplary embodiment is to provide a signal processing circuit, a signal processing method, an optical receiver and an optical communication system which can reduce a scale of a circuit of the optical polarization multiplexing/demultiplexing optical communication system.

Figure 13:
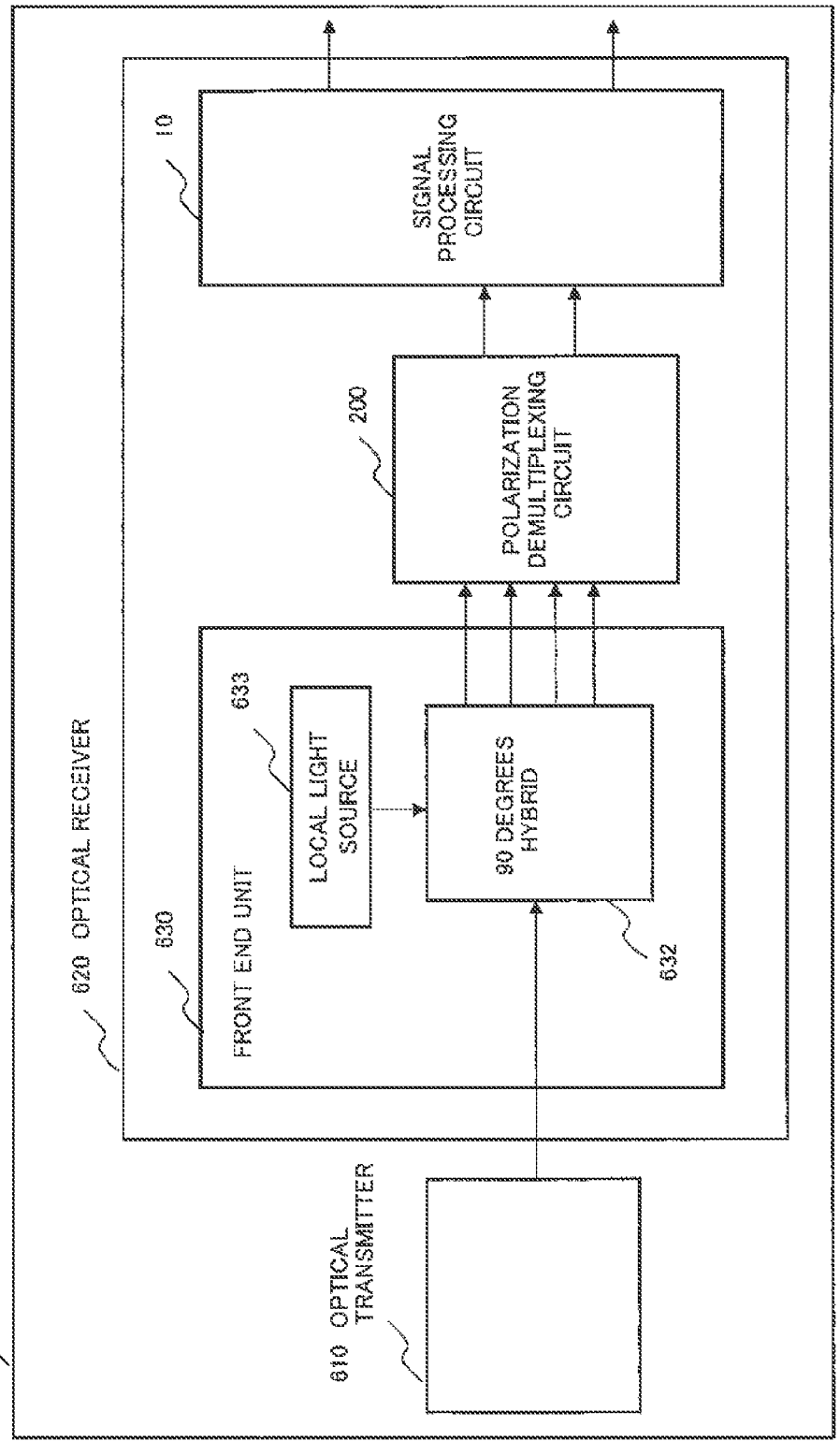
[FIG. 13] A diagram showing a configuration of an optical communication system according to the second exemplary embodiment of the present invention

FIG. 13 shows a configuration of an optical communication system according to the second exemplary embodiment of the present invention. An optical communication system 600 shown in FIG. 13 includes an optical transmitter 610 and an optical receiver 620.

The optical transmitter 610 phase-modulates a plurality of optical carrier waves which have polarization planes able to be demultiplexed from each other, with data different from each other, and transmits the phase-modulated optical carrier waves. Hereinafter, a configuration that the optical transmitter transmits two optical carrier waves whose polarization planes are orthogonal to each other will be described.

The optical receiver 620 is arranged so as to receive the phase-modulated optical carrier waves which the optical transmitter 610 transmits. The optical receiver 620 includes a front end unit 630, the polarization demultiplexing circuit 200 and a signal processing circuit 10. The front end unit 630 includes a 90 degrees hybrid 632 and a local light source 633.

The optical receiver 620 which has the configuration mentioned above receives the phase-modulated optical carrier waves which the optical transmitter 610 transmits. Then, the optical receiver 620 polarization-demultiplexes the received optical carrier waves and compensates a constellation per the polarization.

The optical signal received by the optical receiver 620 is polarization-demultiplexed into an X polarization and a Y polarization orthogonal to each other, by the 90 degrees hybrid 632 of the front end unit 630 arranged in front of the polarization demultiplexing circuit 200. Each of the demultiplexed optical signals is mixed with a local light and consequently generates four beat signals. These beat signals are corresponding to real parts and imaginary parts of optical signals parallel to the polarization planes of the 90 degrees hybrid which are orthogonal to each other. Here, since a configuration of the front end unit 630 is used for mixing the phase-modulated optical signal with the local light and consequently generating the beat signal, is well known in the optical coherent reception method, detailed description is omitted.

Four beat signals corresponding to the real parts and the imaginary part of the X polarization and the Y polarization output by the 90 degrees hybrid 632, are input to the polarization demultiplexing circuit 200 as a X polarization input signal and a Y polarization input signal.

Here, in the case that the polarization multiplexing light is input to the 90 degrees hybrid 632, two polarization planes of the optical carrier waves of the polarization multiplexing light and the polarization planes obtained by the 90 degrees hybrid 532's demultiplexing are not generally identical with each other. For this reason, each of the beat signals includes both the signal data of two polarization-multiplexed optical carrier waves.

The polarization demultiplexing circuit 200 demultiplexes these beat signals into two signal data corresponding to the polarizations of the optical carrier waves which are multiplexed in the optical transmitter. Then, the polarization demultiplexing circuit 200 outputs the signal data demultiplexed correspondingly to the polarizations (X polarization and Y polarization) of the optical carrier waves, to the signal processing circuit 20. Here, it may be preferable that the polarization demultiplexing circuit 200 uses CMA mentioned above as algorithm for demultiplexing the polarizations.

The signal data demultiplexed by the polarization demultiplexing circuit 200 is input to the signal processing circuit 10 as an X polarization input signal and a Y polarization input signal. By rotating the phase of the input signal, the signal processing circuit 20 compensates the frequency deviation and the phase deviation between the local light and the optical carrier wave which the optical transmitter 610 transmits, and restores the constellation existing at a time of the modulation. Hereinafter, a configuration and a work of the signal processing circuit 10 will be described in detail.

Figure 3:
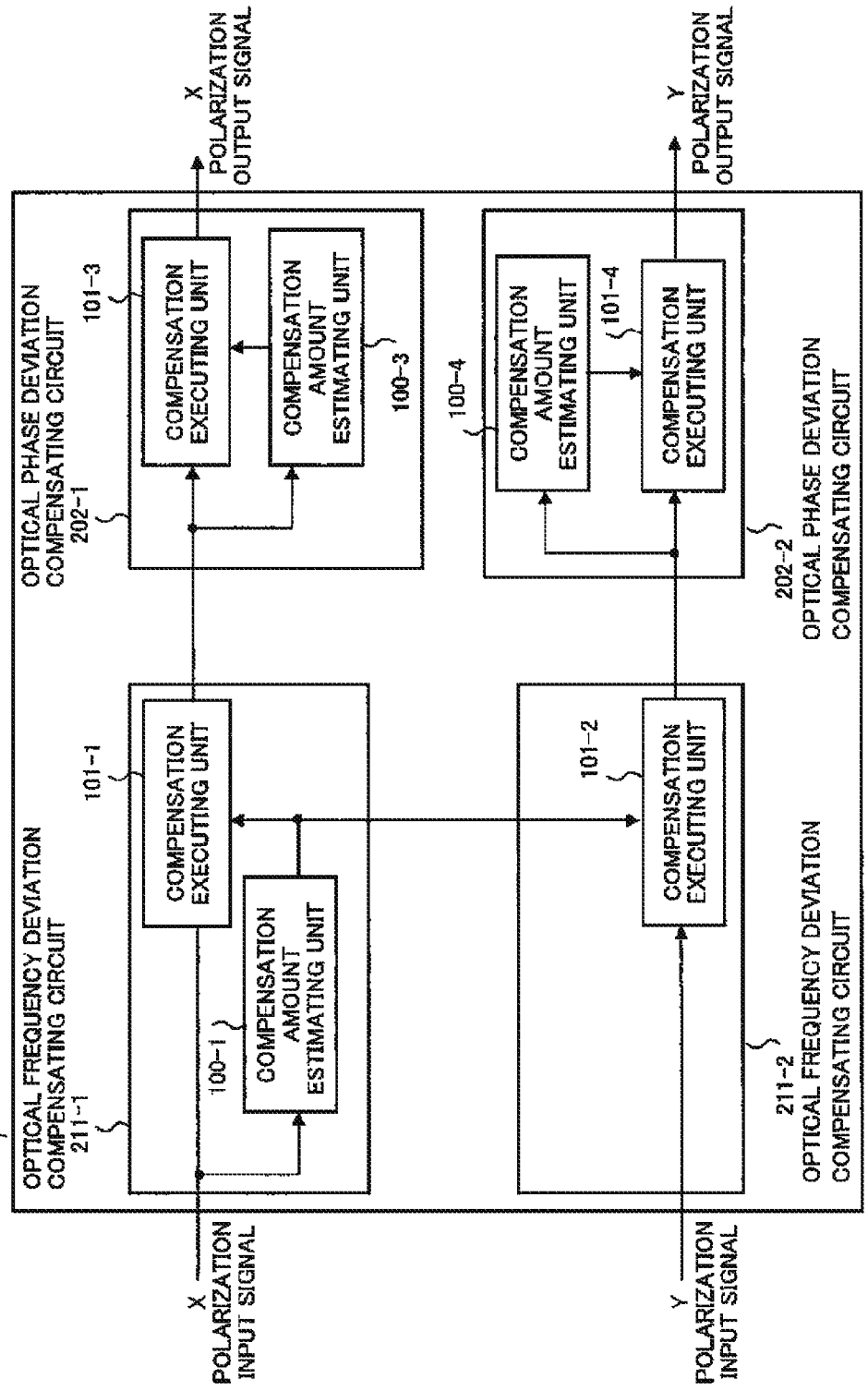
[FIG. 3] A diagram showing a signal processing circuit according to a second exemplary embodiment of the present invention

FIG. 3 shows the configuration of the signal processing circuit 10 according to the second exemplary embodiment of the present invention. As shown in FIG. 3, the signal processing circuit 10 includes optical frequency deviation compensating circuits 211-1, 211-2, and the optical phase deviation compensating circuits 202-1 and 202-2.

Moreover, the optical frequency deviation compensating circuits 211-1 and 211-2 include the compensation executing units 101-1 and 101-2 respectively. Furthermore, one of the optical frequency deviation compensating circuits 201-1 and 201-2 includes the compensation amount estimating unit 100-1. A case that the optical frequency deviation compensating circuit 211-1 includes the compensation amount estimating unit 100-1 as shown in FIG. 3 will be described in the second exemplary embodiment.

Additionally, the optical phase deviation compensating circuit 202-1 includes the compensation executing unit 101-3 and the compensation amount estimating unit 100-3. The optical phase deviation compensating circuit 202-2 includes the compensation executing unit 101-4 and the compensation amount estimating unit 100-4.

The beat signals demultiplexed into the signal data per the polarization of the optical carrier wave by the polarization demultiplexing circuit 200, are input into the optical frequency deviation compensating circuits 221-1 and 221-2 as the X polarization input signal and the Y polarization input signal respectively. Each of the optical frequency deviation compensating circuits 211-1 and 211-2 compensates rotation of the constellation caused by a wavelength difference (frequency difference) between the optical carrier wave of the optical transmitter and the local light of the optical receiver.

The compensation amount estimating unit 100-1 included in the optical frequency deviation compensating circuit 211-1 includes the phase error detecting part 102, the filter part 103 and the phase compensation amount calculating part 104 similarly to the phase compensation amount estimating unit 100 shown in FIG. 8. Then, the compensation amount estimating unit 100-1 calculates the optical frequency deviation on the basis of the optical phase deviation and outputs the amount of phase compensation used for compensating the optical frequency deviation, as the estimated value. It may be preferable that the compensation amount estimating unit 100-1 uses the M-th Power Algorithm as algorithm for detecting a change in the optical phase deviation. Each of the compensation executing units 101-1 and 101-2 compensates the optical frequency deviation by making a phase of the input signal rotated on the basis of the estimated value output by the compensation amount estimating unit 100-1.

Here, the optical frequency deviation compensating circuit 211-1 provides both of the compensation amount executing units 101-1 and 101-2 with the estimated value which the compensation amount estimating unit 100-1 estimates. In this point, the configuration of the signal processing circuit 10 shown in FIG. 3 is different from one of the signal processing circuit shown in FIG. 11.

The signal data input to the optical frequency deviation compensating circuits 211-1 and 211-2 are received at an identical time by the optical receiver 520. Accordingly, it may be proper to think that these optical frequency deviations of both the signal data are almost identical with each other. Accordingly, it may be preferable that the estimated value of the frequency deviation estimated by the compensation amount estimating unit of one optical frequency deviation compensating circuit, is applied to compensating the frequency deviation of the signal data which the other optical frequency deviation compensating circuit processes. By providing the estimated value estimated by the compensation amount estimating unit 100-1, to both of the compensation amount executing units 101-1 and 101-2, it is possible to compensate the other optical frequency deviation with accuracy free from a practical trouble. That is, according to the signal processing circuit 10 of the second exemplary embodiment, it is not necessary for the optical frequency deviation compensating circuit 211-2 to include the compensation amount estimating unit. As a result, according to the signal processing circuit 10 of the second exemplary embodiment, it is possible to reduce the scale of the signal processing circuit which is corresponding to a scale of one compensation amount estimating unit.

The signal data whose optical frequency deviations are compensated are input to the optical phase deviation compensating circuits 202-1 and 202-2 respectively. The optical phase deviation compensating circuit 202-1 includes the compensation executing unit 101-3 and the compensation amount estimating unit 100-3. The optical phase deviation compensating circuit 202-2 includes the compensation executing unit 101-4 and the compensation amount estimating unit 100-4.

The operations of the optical phase deviation compensating circuits 202-1 and 202-2 are similar to the compensation circuit 201 described previously with reference to FIG. 8. That is, the optical phase deviation compensating circuits 202-1 and 202-2 can compensate fluctuation of the constellation caused, for example, by fluctuation of the phase of the light source of the optical transmitter, or fluctuation of the phase of the local light of the optical receiver. Then, the optical phase deviation compensating circuits 202-1 and 202-2 output a X polarization output signal and a Y polarization output signal respectively which are obtained by compensating the optical frequency deviation and the optical phase deviation of the input signal data.

Figure 4:
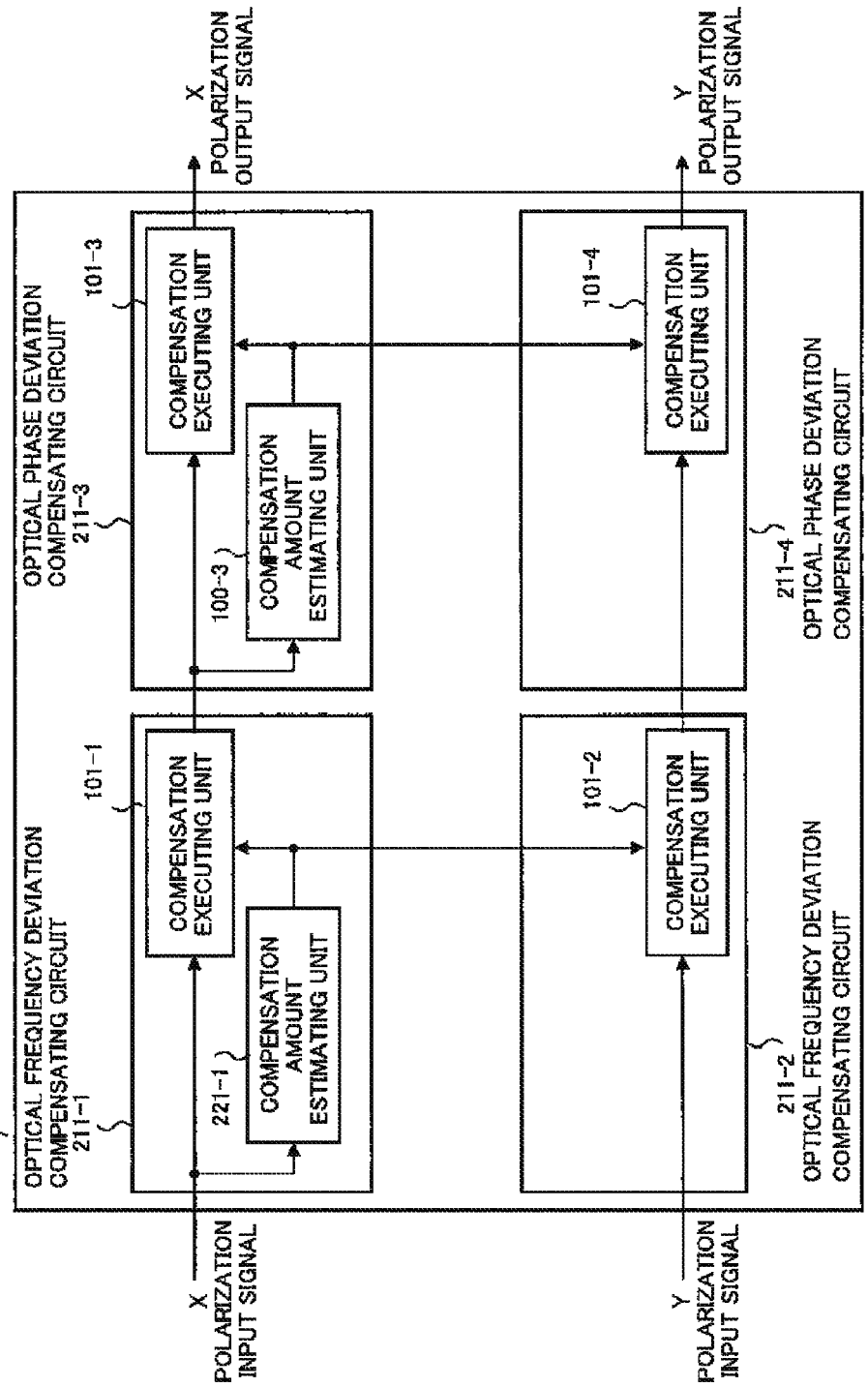
[FIG. 4] A diagram showing a signal processing circuit according to a modification of the second exemplary embodiment of the present invention
Figure 5:
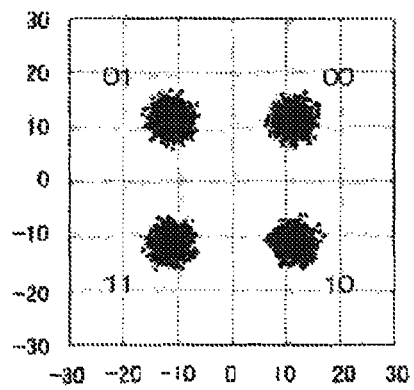
[FIG. 5] A diagram showing examples of a constellation and a symbol mapping of QPSK
Figure 6:
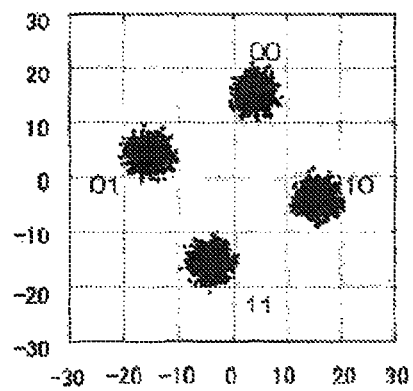
[FIG. 6] A diagram showing a constellation of a QPSK signal in a case that an optical phase deviation exists
Figure 7:
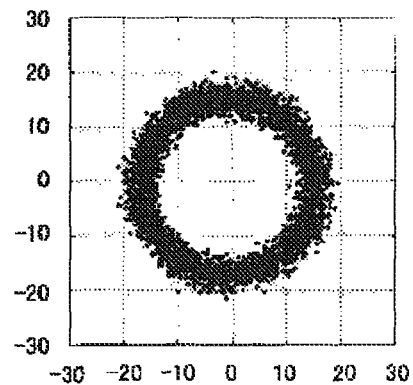
[FIG. 7] A diagram showing a constellation of the QPSK signal which is rotated temporally in a case that an optical frequency deviation exists

FIG. 4 exemplifies a modification of the signal processing circuit according to the second exemplary embodiment of the present invention. According to a signal processing circuit 11 shown in FIG. 4, the optical frequency deviation compensating circuits 211-1 and 211-2 in FIG. 3 are used as optical phase deviation compensating circuits 211-3 and 211-4 respectively. That is, the signal processing circuit 11 has a configuration that the estimation value of the amount of compensation estimated by one optical phase deviation compensating circuit is provided to the other optical phase deviation compensating circuit.

In FIG. 4, the signal processing circuit 11 includes the optical phase deviation compensating circuits 211-3 and 211-4 in place of the optical phase deviation compensating circuits 202-1 and 202-2 shown in FIG. 3. The optical phase deviation compensating circuit 211-3 notifies the optical phase deviation compensating circuit 211-4 of the estimated value of the optical phase deviation which the optical phase deviation compensating circuit 211-3 detects. The optical phase deviation compensating circuit 211-4 compensates the optical phase deviation on the basis of the estimated value of the amount of optical phase deviation notified by the optical phase deviation compensating circuit 211-3.

The signal processing circuit 11 which has the configuration mentioned above has an effect that it is possible to reduce furthermore a scale of the optical phase deviation compensating circuit corresponding to a scale of one amount of compensation estimating circuit, in comparison with the signal processing circuit 10 shown in FIG. 3.

As described above, the second exemplary embodiment and the modification of the second exemplary embodiment bring an effect that it is possible to reduce a scale of the signal processing circuit which compensates the optical frequency deviation and the optical phase deviation.

Here, it may be preferable that the signal processing circuit 10 includes only the compensation amount estimating unit 100-1. In this case, the compensation amount estimating unit 100-1 calculates the amount of compensation which the compensation executing unit 101-2 uses, on the basis of the input signal data, and outputs the calculated amount of compensation.

That is, it may be preferable to set a configuration so that a first signal data out of the beat signals generated by mixing the optical carrier waves phase-modulated and are orthogonal to each other, with the local right, may be input into the compensation amount estimating unit 100-1. Moreover, it may be preferable that the compensation amount estimating unit 100-1 calculates the estimated value of the amount of phase compensation used for making a phase of the first data and a phase of signal data other than the first data rotated, on the basis of the first signal data.

The signal processing circuit 10 which has the configuration mentioned above, calculates the estimated value of the amount of phase compensation used for making the phase of the first data and the phase of signal data other than the first data rotated, by use of one compensation amount estimating unit 100-1. As a result, also in the case that the signal processing circuit 10 includes only one compensation amount estimating unit 100-1, the effect that it is possible to reduce a scale of the signal processing circuit which compensates the optical frequency deviation and the optical phase deviation is obtained.

While the present invention has been described with reference to the exemplary embodiment, the present invention is not limited to the above-mentioned exemplary embodiment. It is possible to add various changes, which a person skilled in the art can understand, to the composition and the details of the invention according to the present application within the scope of the present invention.

This application is based upon and claims the benefit of priority from Japanese Patent Application No. 2011-031647, filed on Feb. 17, 2011, the disclosure of which is incorporated herein in its entirety by reference.

Reference Signs List 10, 11, 20, 21 and 22 Signal processing circuit
100, 100-1, 100-2, 100-3 and 100-4 Compensation amount estimating unit
101, 101-1, 101-2, 101-3 and 101-4 Compensation executing unit
102 Phase error detecting part
103 Filter part
104 Phase compensation amount calculating part
200 Polarization demultiplexing unit
201 and 301 Compensation circuit
201-1 and 201-2 Optical frequency deviation compensating circuit
202-1, 202-2, 211-3, 211-4, 221-3 and 221-4 Optical phase deviation compensating circuit
204 Compensation amount analyzing unit
211-1, 211-2, 221-1 and 221-2 Optical frequency deviation compensating circuit
500 and 600 Optical communication system
510 and 610 Optical transmitter
520 and 620 Optical receiver
530 and 630 Front end unit
532 and 632 90 degrees hybrid
533 and 633 Local light source

The invention claimed is:

1. A signal processing circuit, comprising:
an optical frequency deviation estimating unit
that inputs a plurality of signal data that are generated by
mixing a plurality of optical carrier waves with a local light, which optical carrier waves are phase-modulated and have polarizations able to be demultiplexed from each other, and that corresponds to the polarizations of each of the optical carrier waves,
that estimates a frequency deviation which is included in each of the plurality of input signal data and is a difference between a frequency of the optical carrier wave and a frequency of the local light, per the signal data, and
that outputs the estimated frequency deviation as an estimated value;
an optical frequency deviation compensation amount analyzing unit that calculates an amount of frequency compensation which is an amount of compensation to make a phase of the signal data rotated so as to reduce the frequency deviation, on the basis of a plurality of the estimated values estimated per the signal data;
an optical frequency deviation compensating unit that makes the phase of the signal data rotated correspondingly to the amount of the frequency compensation;
an optical phase deviation estimating unit that estimates a phase deviation included in each the input signal data and is a difference between a phase of the optical carrier wave and a phase of the local light, per the signal data; and
an optical phase deviation compensating unit that makes the phase of the signal data rotated correspondingly to the phase deviation.

2. The signal processing circuit according to claim 1, wherein
the optical frequency deviation compensation amount analyzing unit outputs an average value of the plurality of the estimated values as the amount of frequency compensation.

3. The signal processing circuit according to claim 1, wherein
in the case that one of the estimated value of the plurality of the estimated values is not smaller by a predetermined value than the one of the estimated value at previous time and the rest of the plurality of the estimated values, the amount of frequency compensation is calculated on the basis of any one of the estimated value at the previous time and the rest of the plurality of the estimated values.

4. A signal processing circuit, comprising:
an optical frequency deviation estimating unit
that inputs a plurality of signal data that are generated by mixing a plurality of optical carrier waves with a local light which optical carrier waves are phase-modulated and have polarizations able to be demultiplexed from each other, and that signal data corresponds to the polarizations of the optical carrier waves respectively, and
that estimates a frequency deviation included in each the input signal data and is a difference between a frequency of the optical carrier wave and a frequency of the local light, per the signal data;
an optical frequency deviation compensating unit that makes a phase of the signal data rotated correspondingly to the frequency deviation;
an optical phase deviation estimating unit
that estimates a phase deviation included in each the input signal data and which is a difference between a phase of the optical carrier wave and a phase of the local light, per the signal data, and
that outputs the estimated phase deviation as an estimated value;
an optical phase deviation amount compensation analyzing unit that calculates an amount of phase compensation which is an amount of compensation to make the phase of the signal data rotated so as to reduce the phase deviation, on the basis of a plurality of the estimated values estimated per the signal data; and
an optical phase deviation compensating unit that makes the phase of the signal data rotated correspondingly to the amount of phase compensation.

5. The signal processing circuit according to claim 4, wherein
the optical phase deviation compensation amount analyzing unit outputs an average value of the plural estimated values as the amount of phase compensation.

6. The signal processing circuit according to claim 4, wherein
in the case that one of the optional estimated value of the plural estimated values is not smaller by a predetermined value than the estimated value of the one at previous time, and the rest of the plural estimated values, the amount of phase compensation is calculated on the basis of any one of the estimated value at the previous time, and the rest of the plural estimated values.

7. An optical receiver, comprising:
a front end unit
that receives a plurality of optical carrier waves which have polarizations able to be demultiplexed from each other and are phase-modulated, and
that generates signal data by mixing the carrier wave with a local light and afterward carrying out an photoelectrical conversion;
a polarization demultiplexing unit that carries out demultiplexing the signal data output from the front end unit, per the polarization of the optical carrier wave which is able to be demultiplexed; and
the signal processing unit according to claim 1, that inputs the signal data provided by the polarization demultiplexing unit.

8. An optical communication system, comprising:
an optical transmitter to phase-modulate a plurality of optical carrier waves which have polarizations able to be demultiplexed from each other, and to transmits the phase-modulated optical carrier waves; and
an optical receiver according to claim 7, to be arranged so as to receive the phase-modulated optical carrier wave.

9. A signal processing method, comprising:
estimating a frequency deviation per signal data,
that is included in a plurality of signal data and is a difference between a frequency of optical carrier wave and a frequency of local light, which signal data are generated by mixing a plural of the optical carrier waves with the local light and corresponds to polarizations of the optical carrier waves respectively and which optical carrier waves are phase-modulated and have polarizations able to be demultiplexed from each other, and
calculating an amount of frequency compensation which is an amount of compensation to make a phase of the signal data rotated so as to reduce the frequency deviation, on the basis of a plurality of the estimated values estimated per the signal data;
making the phase of the signal data rotated correspondingly to the amount of the frequency compensation;
estimating a phase deviation included in each the input signal data and which is a difference between a phase of the optical carrier wave and a phase of the local light, per the signal data; and making the phase of the signal data rotated correspondingly to the phase deviation.

10. A signal processing method, comprising:

estimating a frequency deviation per signal data,
that is included in a plurality of signal data and is a difference between a frequency of optical carrier wave and a frequency of local light, which signal data are generated by mixing a plural of the optical carrier waves with the local light and corresponds to polarizations of the optical carrier waves respectively and which optical carrier waves are phase-modulated and have polarizations able to be demultiplexed from each other, and making a phase of the signal data rotated correspondingly to the frequency deviation;

estimating a phase deviation included in each of the signal data and which is a difference between a phase of the optical carrier wave and a phase of the local light, per the signal data, and outputting the estimated phase deviation as an estimated value;

calculating an amount of phase compensation which is an amount of compensation to make the phase of the signal data rotated so as to reduce the phase deviation, on the basis of a plurality of the values estimated per the signal data; and making the phase of the signal data rotated correspondingly to the amount of the phase compensation.

11. A signal processing method, comprising:

calculating an amount of phase compensation used for making a phase of signal data except for a first signal data out of plural signal data which signal data are generated by mixing a plurality of the optical carrier waves with the local light and corresponds to polarizations respectively which optical carrier waves are phase-modulated and have polarizations able to be demultiplexed from each other, rotated so as to reduce a phase deviation between a frequency of an optical carrier wave and a frequency of a local light, on the basis of the first signal data.

12. A signal processing circuit, comprising:

optical frequency deviation estimating means
for inputting a plurality of signal data that are generated by mixing a plurality of optical carrier waves with a local light, which optical carrier waves are phase-modulated and have polarizations able to be demultiplexed from each other, and that corresponds to the polarizations of each of the optical carrier waves, for estimating a frequency deviation which is included in each of the plurality of input signal data and is a difference between a frequency of the optical carrier wave and a frequency of the local light, per the signal data, and for outputting the estimated frequency deviation as an estimated value;

optical frequency deviation compensation amount analyzing means for calculating an amount of frequency compensation which is an amount of compensation to make a phase of the signal data rotated so as to reduce the frequency deviation, on the basis of a plurality of the estimated values estimated per the signal data;

optical frequency deviation compensating means for making the phase of the signal data rotated correspondingly to the amount of the frequency compensation;

optical phase deviation estimating means for estimating a phase deviation included in each the input signal data and is a difference between a phase of the optical carrier wave and a phase of the local light, per the signal data; and optical phase deviation compensating means for making the phase of the signal data rotated correspondingly to the phase deviation.

* * * * *

UNITED STATES PATENT AND TRADEMARK OFFICE
CERTIFICATE OF CORRECTION

PATENT NO.         : 8,705,987 B2
APPLICATION NO.    : 13/990603
DATED              : April 22, 2014
INVENTOR(S)        : Daisaku Ogasahara Page 1 of 1

It is certified that error appears in the above-identified patent and that said Letters Patent is hereby corrected as shown below:

Claims

Column 21 cancel claim 11 of US Patent 8,705,987 for corresponding to non-elected claim 12 of US Application 13/990,603, and add elected claim 14 of US Application 13/990,603, the claim reciting:

"14. A signal processing circuit, comprising:
optical frequency deviation estimating means
for inputting a plurality of signal data that are generated by mixing a plurality of optical carrier waves with a local light which optical carrier waves are phase-modulated and have polarizations able to be demultiplexed from each other, and that signal data corresponds to the polarizations of the optical carrier waves respectively, and
for estimating a frequency deviation included in each the input signal data and is a difference between a frequency of the optical carrier wave and a frequency of the local light, per the signal data;
optical frequency deviation compensating means for making a phase of the signal data rotated correspondingly to the frequency deviation;
optical phase deviation estimating means
for estimating a phase deviation included in each the input signal data and which is a difference between a phase of the optical carrier wave and a phase of the local light, per the signal data, and
for outputting the estimated phase deviation as an estimated value;
optical phase deviation amount compensation analyzing means for calculating an amount of phase compensation which is an amount of compensation to make the phase of the signal data rotated so as to reduce the phase deviation, on the basis of a plurality of the estimated values estimated per the signal data; and
optical phase deviation compensating means for making the phase of the signal data rotated correspondingly to the amount of phase compensation."

Signed and Sealed this
Fifth Day of April, 2016

Michelle K. Lee
*Director of the United States Patent and Trademark Office*